Figure 1:
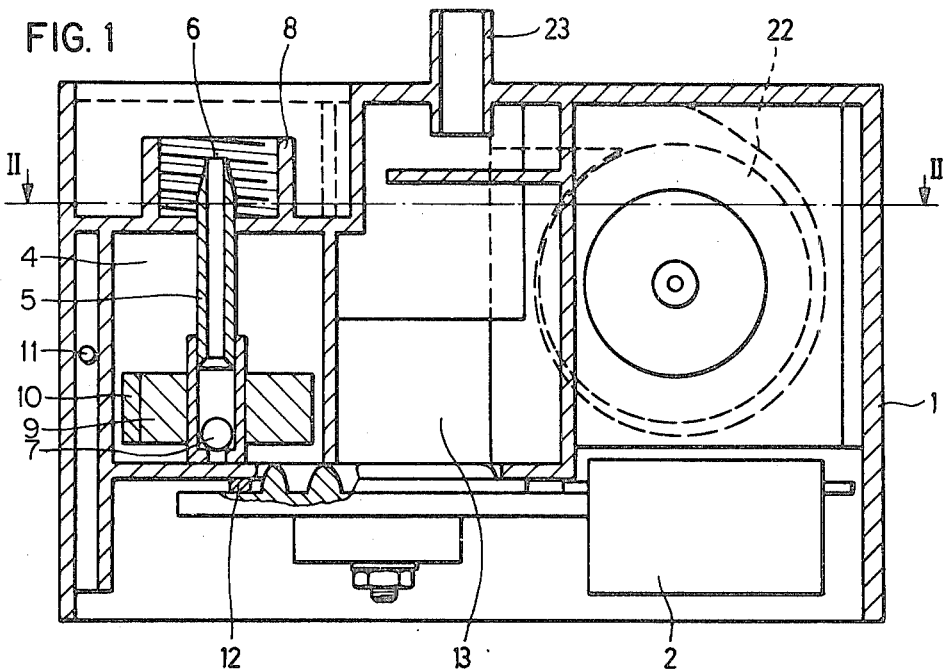

United States Patent [19]

Zurschmiede

[11] 4,198,059

[45] Apr. 15, 1980

[54] METHOD AND MEANS FOR PLAYING BACK OR MOVING OF RECORDS OR TAPES SUBSTANTIALLY FREE OF ELECTROSTATIC CHARGES

[76] Inventor: Fred Zurschmiede, Bleichemattstrasse 12, 4562 Biberist, Soleure, Switzerland

[21] Appl. No.: 939,516

[22] Filed: Sep. 5, 1978

[30] Foreign Application Priority Data

Sep. 6, 1977 [CH] Switzerland .......................... 10862/77

[51] Int. Cl.$^2$ .............................................. G11B 3/58
[52] U.S. Cl. .................................................... 274/47
[58] Field of Search ..................... 274/47; 361/221, 212

[56] References Cited

U.S. PATENT DOCUMENTS

| 2,976,551 | 3/1961 | Watts | 274/42 X |
| 2,977,127 | 3/1961 | Mertes | 274/47 X |

OTHER PUBLICATIONS

"Record & Tape Cleaning Products" by Schweizer Design pp. 0205, 0207.

Primary Examiner—Harry N. Haroian
Attorney, Agent, or Firm—Townsend and Townsend

[57] ABSTRACT

A method of playing back or moving an electrically nonconductive recording medium, such as magnetic tape, film, perforated tape, record or video record on a recorder or a reproduction unit substantially free of electrostatic charges. In order to prevent the building of electrostatic charges on the movable electric nonconductive recording medium, the recording medium is moistened by an aerosol composed of air and water dispersed in the form of droplets. The aerosol is blown under over pressure on the recording medium of a recorder or a reproduction unit through the delivery means.

The means to perform the method is a combination of an ultra-sonic oscillator, a membrane actuated by the pulses of the oscillator, a filler chamber for liquid connected with the space located over the membrane, a blower and a manually or automatically operated followup supply line of aerosol or immovably seated jets.

**

METHOD AND MEANS FOR PLAYING BACK OR MOVING OF RECORDS OR TAPES SUBSTANTIALLY FREE OF ELECTROSTATIC CHARGES

The invention relates to a method of playing back or moving an electrically nonconductive recording medium, such as magnetic tape, film, perforated tape, record or video record on a recorder or a reproduction unit substantially free of elctrostatic charges, in which the electrostatic charges building on said recording medium are removed in such a way that air having a high degree of humidity is brought on to said recording medium, and to means to perform the method.

Each playing back or moving of electrically nonconductive recording media, as e.g. with picture cameras, magnetic tape recorders, units with perforated tapes, record players etc. creates electrostatic charges which can lead to unpleasant phenomena, such as lightning discharges, or an attraction of unequally charged parts in the form of dust and fines. In the present case a solution how to remove the electrostatic charges and dust will be discussed on the example of a record being played back on a record player. Such a method is analogous to and can be applied also with other embodiments.

There have been known several possible solutions all of which are, however, accompanied with negative secondary phenomena; it is e.g. an antistatic cloth saturated with an antistatic liquid by means of which the records are wiped off before playing them back and so the dust is pressed into the grooves of a plate, or antistatic pistols by means of which the record is treated by an ion stream before its playing back, the effect of which is, however, highly controversial among the experts.

The most suitable art which has been up to now proposed and which has worked unobjectionably is a method of wet playing back the records. Nevertheless, three disadvantageous points can be mentioned in connection with this system. After a first wet play back the same wet play back method has to be used again because otherwise a perceptible increase of noise has to be taken into account. A second big disadvantage of such a method consists in the fact that after each play back of the record the liquid band has to be removed with an absorbent cloth which is rather troublesome. Lastly, such a method cannot be automized and cannot therefore be used in sound studios.

It is the object of the invention to maintain the advantages of the wet play back method as far as its effects are concerned whereby the known above-mentioned negative points should be eliminated.

The present invention in one aspect provides a method in which water dispersed into droplets is fed into air to produce aerosol which is blown under pressure through a delivery means to said recording medium of said recorder or said reproduction unit to moisten microscopically thinly said recording medium.

The means to perform the method is a combination of the following:
— a ultra-sonic oscillator (generator) producing pulses to be repeated by a membrane,
— a filler chamber for liquid having a shut-off tube and a float provided with a magnet, said chamber being connected to a space located over said membrane,
— a blower unit driving the produced aerosol from a mist chamber located over said membrane, and
— a manually or automatically operated follow-up supply line or immovably seated jets for delivering aerosol on to said recording medium.

Instead of liquid air having a high point of saturation is used by means of which the record preceding the play-back needle is slightly moistened, as it is the case with a wet playing back method, and evokes so a wet effect. The moisture film evaporates in seconds and is absorbed in the surrounding atmosphere.

A high moisture saturation point of air can be achieved in different ways, e.g. by warming water, conducting air over a large water surface, forcing air to pass a moist and porous material etc,. The most efficient way how to produce air saturated with water is to disperse water by ultrasound. In this way a cool mist (aerosol) is created which is called further solely a mist, having droplets of a diameter of a few micromillimeters, which mist can be led as far as the record because of its comperatively low temperature without condensing beforehand in the supply lines.

Figure 2:
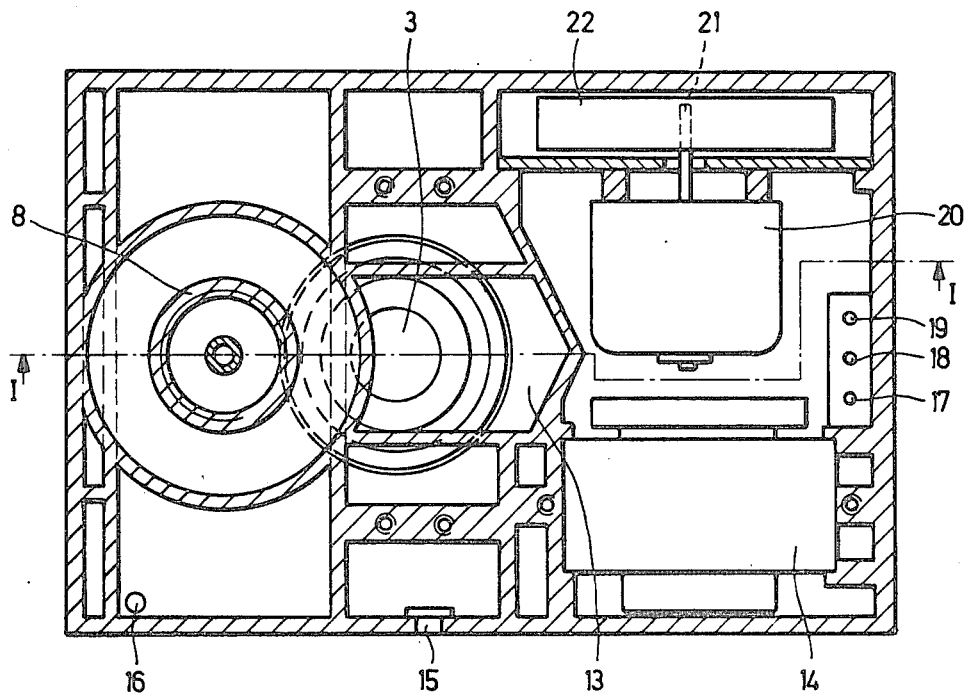
Figure 3:
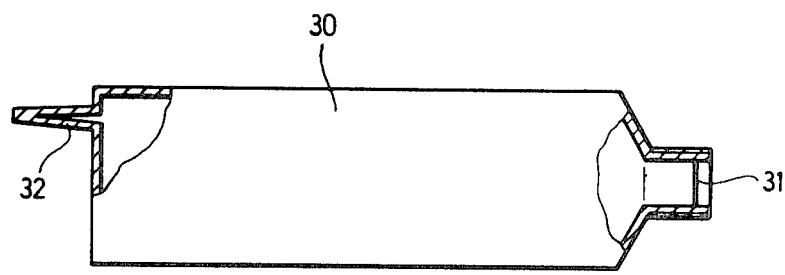
Figure 4:
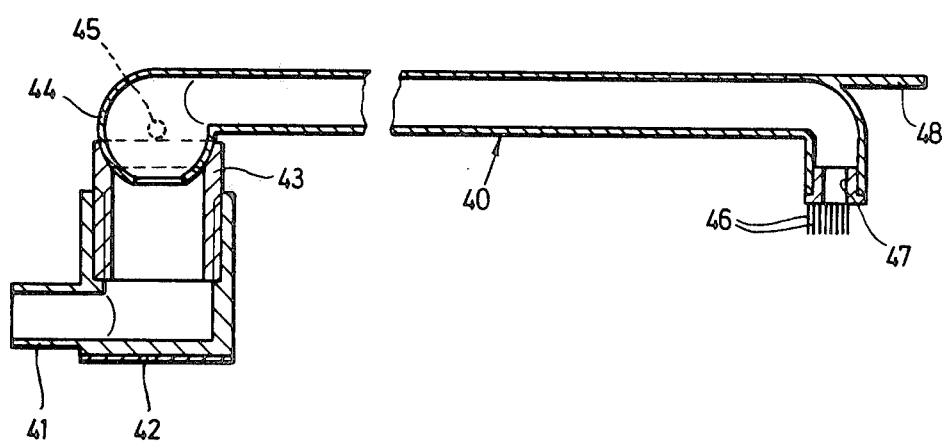
Figure 5:
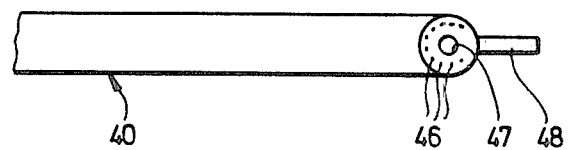

In order to illustrate the method more clearly a prefered embodiment of the means to perform the method will be now described in detail with reference to the drawings, in which FIG. 1 is a section along the line I—I of FIG. 2 of a ultra-sonic atomizing unit with a blower, FIG. 2 is a section along the line II—II of FIG. 1, FIG. 3 is an elevation of a bottle containing a liquid, partially in section, FIG. 4 is a section of a swivel arm for the supply of aerosol and FIG. 5 is an elevation seen from below of the swivel arm according to FIG. 4, which is partially broken off.

The ultra-sonic atomization unit is known and is commerically available. With reference to the FIGS. 1 and 2 an embodiment of a ultra-sonic atomization unit will now be described, which unit was developed for the generation of the atomized atmosphere to be used. The means shown in the Figures serves for playing back or moving an electrically nonconductive recording medium, such as magnetic tape, film, perforated tape, record or video record substantially free of electrostatic charges, which means is provided on a recorder or a reproduction unit. During the playing back or moving of an electrically nonconductive recording medium electrostatic charges build on the recording medium; such electrostatic charges have to be eliminated in order to achieve e.g. with a record a substantially static-free sound reproduction. Water dispersed in droplets by ultrasound fed into air and the so produced aerosol is brought under pressure onto the recording medium. The aerosol is blown onto the recording medium of a recorder or a reproduction unit by means of a delivery means so that the recording medium is microscopically thinly moistened. Such a moisture film evaporates again in seconds and is absorbed by the surrounding atmosphere.

The means consists of a plastic housing 1 in which a ultra-sonic oscillator 2 is water-tightly mounted on a rubber sealing 12. The oscillator 2 generates pulses which are repeated by a metal membrane 3 which is put so in vibratory movement. The level of liquid supplied into a storage chamber 4 to be evaporated by the vibrational movement of the membrane 3 is controlled by a ball 7 pressing against the conical seat of a shut-off tube 5 provided in the storage chamber 4 and closing the supply of the liquid when the liquid level reaches the desired level. A magnetic switch 11 serves as safety device for the ultra-sonic oscillator in such a way that it turns on the ultra-sonic oscillator 2 only when a minimal quantity of liquid is in the storage chamber 4 and thus the membrane 3 is sufficiently covered with liquid. The magnetic switch 11 is actuated by a magnet 10 secure to a float 9 in the storage chamber 4, which float approaches to the level of the magnetic switch 11 when the liquid level rises in the storage chamber 4.

The liquid in the storage chamber 4 is replenished from bottles 30 (see FIG. 3) the filing orifice of which is sealed by a plastic membrane 31. When the bottle is screwed in a threaded cuppling 8 of the filler chamber 4 (see FIGS. 1 and 2), the knife-edge part 6 of the shut-off tube 5 cuts through the plastic membrane 31 and the contents of the bottle 30 is discharged into the filing chamber 4. The air supply required for emptying the bottle 30 is achieved in such a way that an air nipple 32 on the back side of the bottle is cut off so that an opening is provided in the bottom of the bottle. In case that a full bottle has to be exchanged, the air supply opening with the already cutoff nipple 32 has to be again closed. The bottle can be unscrewed and taken away without the liquid flowing out of the bottle having the cut-through membrane 31. There is provided on the threaded part of the bottle in the condition at the time of its supply a not shown cover.

The level of the liquid contained in a mist chamber 13 located over the membrane 3 can be optically checked through a clear glass lense 15 (see FIG. 2). The atomization of the liquid takes place in the mist chamber 13 which is connected with the filing chamber 4. The mist (aerosol) is driven by over pressure produced by a blower 20 having a shaft 21 and a housing 22 through a short pipe 23 (see FIG. 1). The mist comprises water droplets the diameter of which is of a few micromillimeters. A not shown connection hose is attached to the short pipe 23 by means of which the mist is conveyed to a destination station.

The reference numeral 14 in FIG. 2 shows a distribution transformer for the entire device. In the corner of the device there is provided a discharge opening 16 for liquid. During the operation of the device the discharge opening is closed.

The base of the atomization unit or device can be electrically interconnected with the mass of the record player over an electric plug contact 17 (see FIG. 2) which gives an absolute guarantee that the possibly already built electrostatic charges are immediately eliminated. The can be switched on or switched off by means of plug contacts 18 and 19 (see FIG. 2). This is especially important with an automatic operation, when a jet follows a tone arm of a not shown record player in a contactless manner to discharge locally the mist. In the supported position of the tone arm the atomization process is always switched off and it is only switched on when the tone arm is in the proximity of the record.

With a manually operated follow-up device according to FIG. 4 there is provided on the atomization unit (see FIG. 2) between the contacts 18 and 19 a not shown switch by means of which the atomization process is switched on or off by hand operation.

The hand operated follow-up device according to FIGS. 4 and 5 comprises a connection piece 41 which is connected by a flexible hose with the short pipe 23 (see FIG. 1), and a swivel arm 40. The connection piece 41 is provided on its base with an adhesive band 42 or a not shown permanent magnet which enable its fixation on the chassis of the record player. The cone piece 43 is screwed in the connection pipe 41 and can be adjusted in height. The swivel arm 40 with its hemispherical end portion 44 is freely placed on the cone piece 43 and is movable at will. In order to block the swivel arm 40 against tortional movements, there are provided two blocking pins 45 on both sides of the hemispherical end portion 44 the axis of which passes exactly through the middle of the ball and is at right angles to the swivel axis of the swivel arm 40. When both the blocking pins 45 are pressed against the edge of the cone piece 43 the swivel arm 40 is blocked against the tortional movements. The swivel arm 40 can be manually put on the record by means of a handle 48.

The brushes 46 serve to further transporting the swivel arm 40. Besides, they remove bigger dust particles from the record. The mist can be streamed on to the record through a jet 47; in this way the above described function can be carried out as well.

It is to be mentioned that the mist (aerosol) is produced at such a low temperature that it doesn't condense during its supply through the delivery means. The condensation takes place only when the mist is blown on to the recording medium.

What I claim is:

1. Apparatus for delivering moisture to and for forming a relatively thin layer of moisture on a surface portion of a recording medium constructed of an electrically non-conducting material preparatory to the passage of such surface portion past a reading/recording station, the apparatus comrpising: a housing defining a chamber for holding a body of liquid; means for flowing liquid into the chamber, means for interrupting the flow of liquid into the chamber after the liquid has reached a predetermined level therein, and means for sensing the level of the body of liquid in the chamber; the housing further defining a mist compartment in fluid communication with the chamber, and a membrane defining a wall of the compartment and positioned so that the membrane is in contact with liquid in the compartment; an ultrasonic oscillator operatively coupled to the membrane for subjecting the membrane to ultrasonic pulses sufficient to atomize at least a portion of the liquid in the compartment into a mist comprising relatively small liquid droplets; blower means for generating a flow of pressurized air; conduit means fluidly connecting a station of the mist compartment holding the mist with the blower means so as to entrain the mist in the airflow generated by the blower means and thereby form a pressurized aerosol stream comprising air and liquid droplets dispersed therein; delivery means fluidly connected with the conduit means and the blower means for flowing the aerosol stream towards the surface portion of the recording medium; and discharge means fluidly connected with the delivery means for flowing the aerosol stream over the surface portion of the recording medium to establish a liquid film thereon and to thereby eliminate the electrostatic charges on the surface portion before the surface portion passes the station.

2. Apparatus according to claim 1 wherein the recording medium comprises a recording disc, wherein the reading/recording station is defined by a tone pickup arm of a record player and a stylus carried by the tone pickup arm, and wherein the delivery means comprises a hollow swivel arm extending from the conduit means and the blower means to the vicinity of the stylus on the tone pickup arm of the record player.

3. Apparatus according to claim 1 wherein the delivery means comprises a hollow base for mounting to a support surface, the base including means for adjusting its height and having an upwardly oriented, concave, spherically shaped bearing surface; a movable, hollow swivel arm including a convex, spherically shaped portion which is complementary to the bearing surface and cooperating therewith so as to permit relative movements between the base and the swivel arm, the swivel arm further including a free end defining an aerosol stream discharge jet, and downwardly depending brush means for supporting the swivel arm on a surface beneath the discharge jet.

4. Apparatus according to claim 2, wherein the reading/recording station is defined by a tone pickup arm of a record player and a stylus carried by the tone pickup arm, including swivel control means responsive to movements of the tone pickup arm for moving the hollow swivel arm with the tone pickup arm so that a discharge opening of the swivel arm is at all times in substantial radial alignment with the tone arm.

5. Apparatus according to claim 1 wherein the discharge means is arranged for flowing the aerosol stream over substantially the whole recording medium.

6. Apparatus according to claim 1 including safety means operatively coupled with the liquid level sensing means for preventing the actuation of the ultrasonic oscillator when the liquid level in the chamber falls below a predetermined level.

7. Apparatus according to claim 1 wherein the liquid level sensing means comprises a float disposed in the chamber and a magnet carried by the float so that the float and the magnet rise and fall with the liquid level in the chamber, and including means for preventing the activation of the ultrasonic oscillator when the magnet falls below a predetermined level in the chamber.

8. Apparatus according to claim 7 wherein the means for preventing the activation comprises a magnetic switch located and constructed so as to be actuated in response to movements of the magnet in the chamber.

9. A method for removing electrostatic charges from a surface of a recording medium constructed of a non-conductive material to prevent such charges from moving past a reading/recording station, the method comprising the steps of providing a body of water; atomizing a portion of the body to form a mist comprising a volume of dispersed, relatively small water droplets by subjecting the portion of the body of water to ultrasonic vibrations; flowing a stream of pressurized air to a location on the recording medium from which electrostatic charges are to be removed; entraining the mist in the airstream upstream of the location on the record medium; and contacting the surface of the recording medium at the location with the airstream including the entrained water droplets so as to deposit the water droplets on the surface and thereby moisten the surface at the location; whereby the moisture applied to the surface eliminates electrostatic charges at the location.

10. A method for eliminating electrostatic charges built up on a surface of an electrically non-conducting recording medium moving past a reading/recording station, the method comprising the steps of: generating a stream of pressurized air; forming a mist comprising a volume of fine water droplets and entraining the mist in the airstream; and flowing the airstream with the entrained mist onto a portion of the surface before such portion passes the reading/recording station and at a rate sufficient so that a layer of moisture forms on the surface portion and causes the elimination of electrostatic charges on such surface portion.

11. A method according to claim 10, wherein the step of flowing comprises the step of flowing the airstream and the mist entrained therein through a conduit, and further including the step of maintaining the temperature of the airstream and of the mist entrained therein sufficiently low so as to prevent the condensation of water droplets on the conduit.

12. A method according to claim 10 wherein the step of forming comprising the step of providing a body of water, contacting the body with a plate member, and subjecting plate member to ultrasonic vibrations of a sufficient magnitude to effect the atomization of at least a portion of the body of water into droplets having a diameter in the order of a few micromillimeters.

13. A method according to claim 12 wherein the step of subjecting the plate to ultrasonic vibrations and the formation of relatively small droplets is performed at a location separate of the airstream, and including the step of entraining the droplets in the airstream after the droplets have been formed.

* * * * *